United States Patent
Devanbu et al.

(10) Patent No.: US 6,381,698 B1
(45) Date of Patent: Apr. 30, 2002

(54) SYSTEM AND METHOD FOR PROVIDING ASSURANCE TO A HOST THAT A PIECE OF SOFTWARE POSSESSES A PARTICULAR PROPERTY

(75) Inventors: Premkumar Thomas Devanbu, North Plainfield; Stuart Gerald Stubblebine, Lebanon, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/657,776

(22) Filed: Sep. 8, 2000

Related U.S. Application Data

(63) Continuation of application No. 08/974,675, filed on Nov. 19, 1997, now Pat. No. 6,148,401.
(60) Provisional application No. 60/047,247, filed on May 21, 1997.

(51) Int. Cl.[7] ............................... H04L 9/32; G06F 12/14
(52) U.S. Cl. ....................... 713/170; 713/175; 713/176; 713/181
(58) Field of Search ................................. 713/170, 175, 713/176, 181, 189; 705/58; 380/28, 30

(56) References Cited

U.S. PATENT DOCUMENTS

| | | | |
|---|---|---|---|
| 5,422,953 A | 6/1995 | Fischer | 380/23 |
| 5,692,047 A | 11/1997 | McManis | 380/4 |
| 5,724,425 A | 3/1998 | Chang et al. | 380/25 |
| 5,754,656 A | 5/1998 | Nishioka et al. | 380/25 |
| 5,758,069 A | 5/1998 | Olsen | 395/187.01 |
| 5,825,617 A | 10/1998 | Kochis et al. | 361/686 |
| 5,825,877 A | 10/1998 | Dan et al. | 380/4 |
| 5,872,849 A * | 2/1999 | Sudia | 380/49 |
| 5,892,904 A | 4/1999 | Atkinson et al. | 395/187.01 |

OTHER PUBLICATIONS

Davida et al., "Defending Systems Against Viruses through Cryptographic Authentication," IEEE Computer Society Press. 1989, pp. 312–318.

Rubin, "Secure Distribution of Electronic Documents in a Hostile Environment," Computer Communications, vol. 18, No. 6, Jun. 1995, pp. 429–434.

Yee et al., "Secure Coprocessors in Electronic Commerce Applications," First USENIX Workshop on Electronic Commerce Jul. 12, 1985, pp. 155–170.

* cited by examiner

*Primary Examiner*—Thomas R. Peeso
*Assistant Examiner*—Justin T. Darrow

(57) ABSTRACT

A system and method for providing assurance to a host executing a piece of software that the software possesses a particular property. A certifier determines if a piece of software possesses a particular property, and if it does, it cryptographically signs the software, producing a signature. The software and a certificate that includes the signature is then distributed to a host. The host checks the signature. If the signature is valid, then the host is provided with assurance that the software possesses the particular property. If the signature is not valid, then the host is provided with no such assurance.

23 Claims, 8 Drawing Sheets

SYSTEM AND METHOD FOR PROVIDING ASSURANCE TO A HOST THAT A PIECE OF SOFTWARE POSSESSES A PARTICULAR PROPERTY

CROSS-REFERENCE TO RELATED APPLICATIONS

This application is a continuation of U.S. patent application Ser. No. 08/974,675, filed Nov. 19, 1997, now U.S. Pat. No. 6,148,401, which claims the benefit of provisional application No. 60/047,247, filed May 21, 1997.

BACKGROUND OF THE INVENTION

The field of the present invention is software verification and trust, and in particular relates to providing assurance to a host that a piece of software possesses a particular property.

The advent of distributed computing has increased the need for an efficient way to provide assurance to a host that a piece of software has a property. A piece of software is a set of instructions adapted to be executed by a processor on a host. An example of a processor is a general purpose microprocessor. Another example of a processor is an Application Specific Integrated Circuit (ASIC). Yet another example of a processor is a Digital Signal Processor (DSP).

An example of a property of a piece of software is the identity of the author of the software. Another example of a property is the identity of the compiler used to generate the piece of software. In certain applications, it is important to provide assurance to the host that a piece of software cannot alter the contents of a file stored on a disk drive of the computer on which the software is executed. This is another example of a property of a piece of software.

In a distributed computing environment, software (e.g., applets, servlets, CGI bins, etc.) is obtained by a host from a provider. As used herein, a provider is a party that provides software that is adapted to be executed by a host. An example of a provider is a software manufacturer. Another example of a provider is a server on the World Wide Web connected to the Internet, where the server acts as a middleman, receiving software from a software manufacturer and sending software to hosts to be executed.

A host is a party that executes software. An example of a host is a client with a browser that is adapted to execute Java byte code, the client being adapted to be connected to the World Wide Web through the Internet. For example, a client computer (a host) with a browser obtains a Java applet from a server (a provider) on the World Wide Web over the Internet. The client executes the software, hoping that the software will not have any malicious properties, either intended or accidental, such as infecting the client with a virus, improperly altering files stored on the client, or sending private information stored on the client to another computer connected to the Internet.

Certain known systems provide the client with assurance that the software will not act improperly or maliciously, i.e., that the software has certain properties that preclude such behavior. However, these known systems are of limited usefulness, and can be expensive and inefficient to implement.

One known system for providing assurance relies upon the software provider to extensively test the software once the software is received from the software manufacturer. In one embodiment of this system, a provider tests the software under many possible conditions. If the software passes the tests, then the provider agrees to distribute the software to a host that trusts the provider.

This known system of provider testing can be disadvantageously unreliable because most software cannot be tested under all possible conditions. It is therefor possible that software that passes all of the tests could prove to be harmful when it is used under untested conditions. Further, if the nature of the tests become known by an adverse party, malicious features purposely designed to circumvent the tests could be inserted into the software. This could prove devastating to the host.

If the provider has access to the software manufacturer's source code, it can be easier for the provider to test certain properties of the software statically (without executing the software). But many software manufacturers are reluctant to release source code because it discloses valuable intellectual property (e.g., trade secrets) that is more valuable if kept confidential.

One known system for providing assurance as to the properties of source code is implemented in the Java programming language. Java byte code contains the same information as Java source code. Byte code is portable compiled code that is ready to be interpreted on a platform using a Java interpreter. Java byte code is verified every time a Java applet is received and before it is executed. Software is said to be verified when it is analyzed and determined to possess a particular property. For example, a piece of software can be verified to possess the property of not writing data to any file stored on a host. A "verifier" is a first piece of software adapted to be executed by a processor to verify a second piece of software. Known browsers, such as certain versions of the Netscape Navigator manufactured by the Netscape Communications company, include Java verifiers that verify Java byte code before it is executed.

Java byte code can be verified statically. Byte code is verified statically when it is analyzed by examining the code itself, rather than analyzing its behavior when it is executed. Byte code that is verified by examining its behavior when it is executed is said to be dynamically verified.

An example of property verified in Java byte code by a Java byte code verifier is that a piece of Java byte code contains no type errors. A static type-inference analysis is carried to ensure, for example, that a variable A of type char (character) is not used in the code in such a way as to produce a type error (e.g., type char variable A is not used in arithmetic expressions with floating point variables to yield an integer, i.e., a character string is not added to a real number to yield an integer). If the Java code is approved by the verifier, then it provides a reasonable (as yet formally unproven) basis for the host to conclude the byte code possesses the property of not giving rise to type errors during execution.

However, the verifier can be imperfect, and can indicate that a piece of Java byte code has a property when in fact it does not, at least under certain conditions. Also, analyzing Java byte code every time before it is executed to determine if it has a property disadvantageously imposes a significant burden on the host, especially for analyzing the byte code of large applets.

Because it is imperfect, the Java verifier is continually under development. As used herein, a "verifier" is a set of verification instructions adapted to be executed by a processor to determine if a piece of software (called a "set of subject instructions", or "subject set") possesses a particular property. When a flaw is found in the verifier, the verifier must be revised and updated. Distributing the latest version of the Java verifier is logistically difficult, because the verifier resides at every local platform that executes Java code. For example, the verifier resides in millions of copies of the Netscape browser manufactured by the Netscape Communications company, and it is unlikely that every such browser executes the latest updated version of the Java verifier. Thus, outdated verifiers are widely used, providing a diminished level of security by operating with weaknesses that can be widely known and exploited.

Another approach to providing assurance is provided by formal verification. Software that is formally verified is analyzed mathematically to prove that the software has a property. Formal verification is generally carried out by the host because the provider remains untrusted. Even if the host provides trusted formal verification software to the provider, there is no guarantee that the formal verification software will not be compromised in some way at the provider's site, and thus improperly analyze harmful software without detecting its harmful aspects. Formal verification techniques are also unwieldy, and can often be impractical to implement for software of any real complexity.

The problem of dealing with an untrusted provider has been addressed in one known system by having the provider construct a proof establishing that a piece of software has a property, and shipping the proof along with the binary version of the software to the host. The binary program is annotated to enable the construction of a verification condition by the host. If the host can establish the verification condition, then the host is assured that the software has the property. This advantageously reduces the burden on the host, which must only check the proof, which can be carried out much more quickly and easily than having to construct the proof.

Although generally faster than proof construction, proof checking can still prove to be a substantial task, depending upon the size of the proof. In the case of highly mobile code, such as applets and agents, the proof must be checked for each execution, which can incur unacceptably high overhead for the host. Also, proof checkers are installed and executed on the host computer, and are thus subject to the same logistical problems (distribution and maintenance of updates) as for the Java verifier. Also, in order for proof checking to be effective, the full proof and any invariants that contribute to the proof have to be released by the provider to the host. The disclosure of invariants can actually reveal more valuable proprietary information than the disclosure of source code. Such a disclosure of invariants can disadvantageously compromise the confidentiality and therefore the value of certain of the software manufacturer's intellectual property.

Another method of providing assurance in an automated fashion is the ActiveX model. ActiveX is based upon the assumption that software built by well-known individuals or companies can be trusted. The authenticity of the software is established by an attached cryptographic signature. If the key of the signature corresponds to a key in a trusted group, then the software is accepted and executed without requiring any further static or dynamic checks. Signature checking is very quick, and adds little overhead.

However, the trust provided by the ActiveX system is based only upon establishing the identity of the manufacturer and not more. Relying entirely on the reputation of a manufacturer can be risky. Further, if the cryptographic keys are stolen or misused, signed (and hence trusted) software could wreak havoc on a host. Likewise, if a trusted insider with a trusted key builds malicious software and signs it, the malicious software will be accepted and run without further checking, possibly with disastrous results.

Under yet another known system, providers can have their software tested by a third party that is trusted by the host. The third party analyzes and then signs software if the analysis shows the software to possess a property. The process of analyzing and then signing a piece of software if the analysis shows the software to possess a property is termed "certification". However, the provider must trust the third party to maintain the confidentiality of the testing process and of any intellectual property belonging to the manufacturer. This can make a manufacturer reluctant to use this known system.

In summary, analyzing software properties locally (at the host) can be impractical (particularly in distributed systems) because an updated verifier has to be universally distributed every time a security weakness and/or flaw is discovered in the present version of the verifier. Formally verifying source code at the host can be impractical, burdensome, and involve the disclosure of intellectual property that the software manufacturer would prefer to keep confidential. Having a third party analyze the software and sign it reduces the burden placed on the host and can involve fewer logistical problems, but fails if the third party breaches its trust, or if cryptographic keys are mismanaged.

SUMMARY OF THE INVENTION

According to one embodiment of the present invention, a system and method provide assurance to a host that a set of subject instructions adapted to be executed on a host processor possess a property.

In one embodiment, a verification processor executes a version of a set of verification instructions to determine if the set of subject instructions possess the property. If the set of subject instructions possess the property, then the verification processor cryptographically signs the set of instructions to produce signature information, and in one embodiment of the present invention, distributes the set of instructions with the signature information. In one embodiment, information pertaining to the property verified by the provider can be derived by a host from the set of subject instructions and the signature data. In another embodiment, the provider cryptographically signs property data identifying the property of the set of subject instructions verified by the provider.

When a host receives the set of subject instructions and the signature, the host can use the signature to determine the integrity and the authenticity of the subject set of instructions, as well as the identity of the property verified by the provider. If the host cannot certify the set of subject instructions and the property data using the signature information, then the host does not execute the software. If the host can certify the set of subject instructions and the property data, then the host may execute the software.

DETAILED DESCRIPTION

Figure 1:
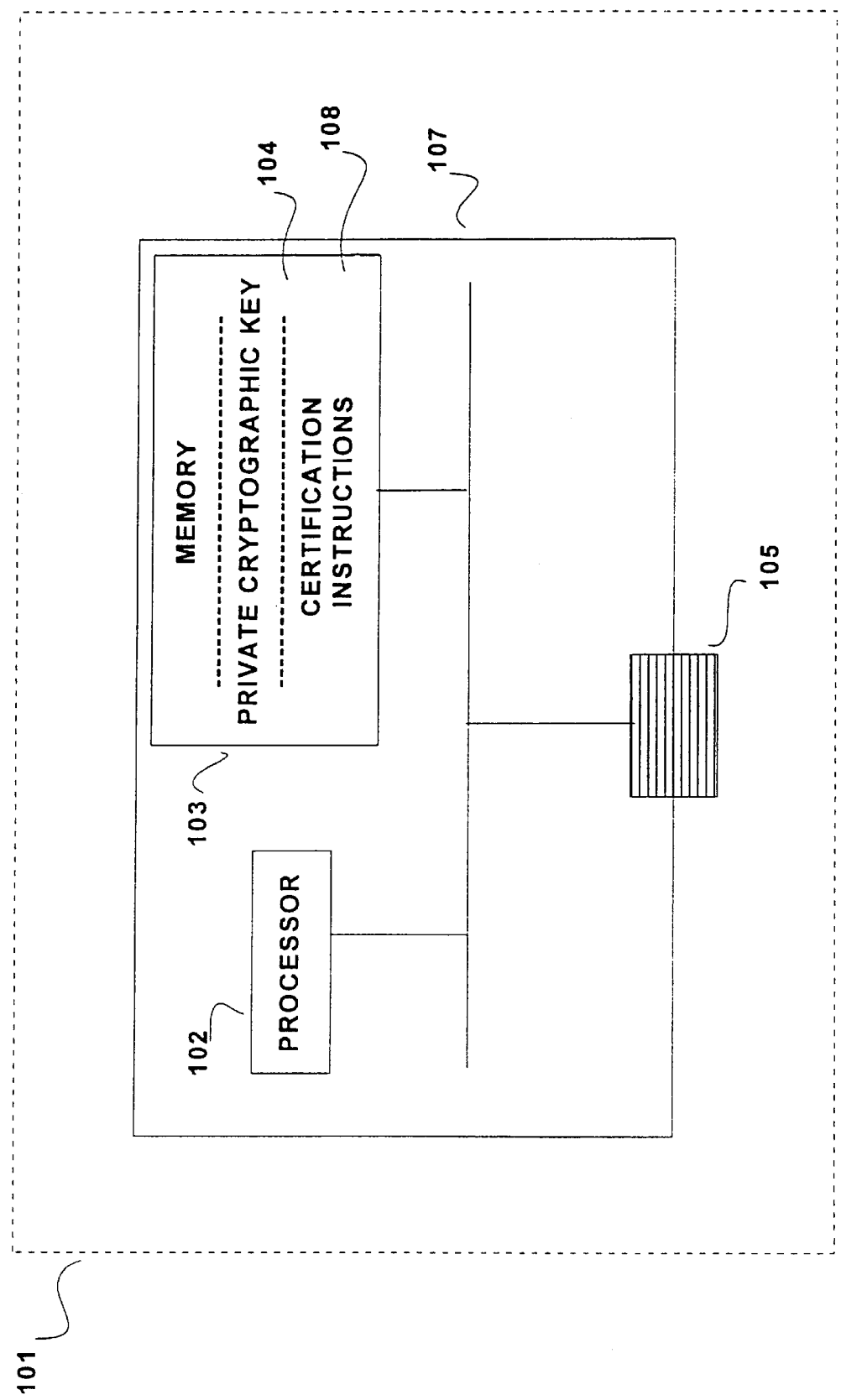
FIG 1 shows a first embodiment of an apparatus in accordance with the present invention.

One embodiment of an apparatus in accordance with the present invention is shown in FIG. 1. A physically secure co-processor PSC) 101 is comprised of a processor 102; memory 103 storing certification instructions 108 adapted to be executed by the processor 102 to determine if a set of subject instructions has a particular property, and if it does, to sign the subject set with a private cryptographic key 104 also stored in memory 103; and an interface 105. The memory 103 and interface 105 are coupled to the processor 102. A tamper-proof enclosure 107 surrounds the processor 102 and computer readable memory 103. The interface 105 is disposed to convey electrical signals through the tamper-proof enclosure 107.

In one embodiment of the present invention, the tamper-proof enclosure 107 includes a conductive strip bonded to the interior of the enclosure 107 which, when electrically interrupted (e.g., from an unauthorized attempt to open the enclosure 107), erases the contents of the computer readable memory 103. In another embodiment, the memory 103 stores instructions which the processor 102 executes to analyze data received through the interface 105. When this data conforms to predetermined conditions (e.g., ten consecutive invalid cryptographic keys are received by the secure co-processor 101 through the interface 105), the processor erases the contents of the memory 103.

In one embodiment of the present invention, the PSC is a smart card. In another embodiment, the PSC is circuit pack. In yet another embodiment, the PSC is a component on a modular hardware card. The PSC can be constructed in accordance with the disclosure of *Secure Coprocessors in Electronic Commerce Applications*, by Bennet Yee and Doug Tygar, Proceedings of the First USENIX Workshop on Electronic Commerce, New York, N.Y., July 1995, which is incorporated herein by reference.

The public and private cryptographic keys disclosed herein are meant to be used in a public key encryption system. In a public key encryption system, keys occur in corresponding pairs. One key of the pair is kept confidential (the "private key"), while the other key of the pair is shared (the "public key"). If one of the pair of keys is used to encrypt data, only the other of the pair can properly decrypt the data.

In one embodiment of the present invention, data is signed by a certifier using a public key encryption system. As used herein, the term "certifier" means a party that certifies software in accordance with the present invention. The certifier signs the data using the certifier's private key. The process of signing a piece of data produces a signature, which is a piece of information that can be sent to a host with the original data. The host can use the signature to ascertain if the data with which the signature is associated has been certified by a particular party or member of a group of parties.

In one embodiment, a signature is produced by generating a message digest from the data and then encrypting the message digest using the certifier's private key. A message digest functions much like a serial number to uniquely identify the data from which it is derived. Here, the encrypted message digest is the signature.

The original data and its encrypted message digest are sent to a host. The host uses the same method used by the certifier to derive the same message digest from the data. The host then uses the certifier's public key to decrypt the encrypted message digest (the signature). Only the certifier's public key can decrypt the signature properly. If the decrypted signature from the certifier is identical to the message digest generated by the host, then the signature has been determined to be valid by the host, and the host is assured that the data was certified by the certifier. If the decrypted signature is not the same as the message digest generated by the host, then the signature is determined to be invalid by the host.

Figure 2:
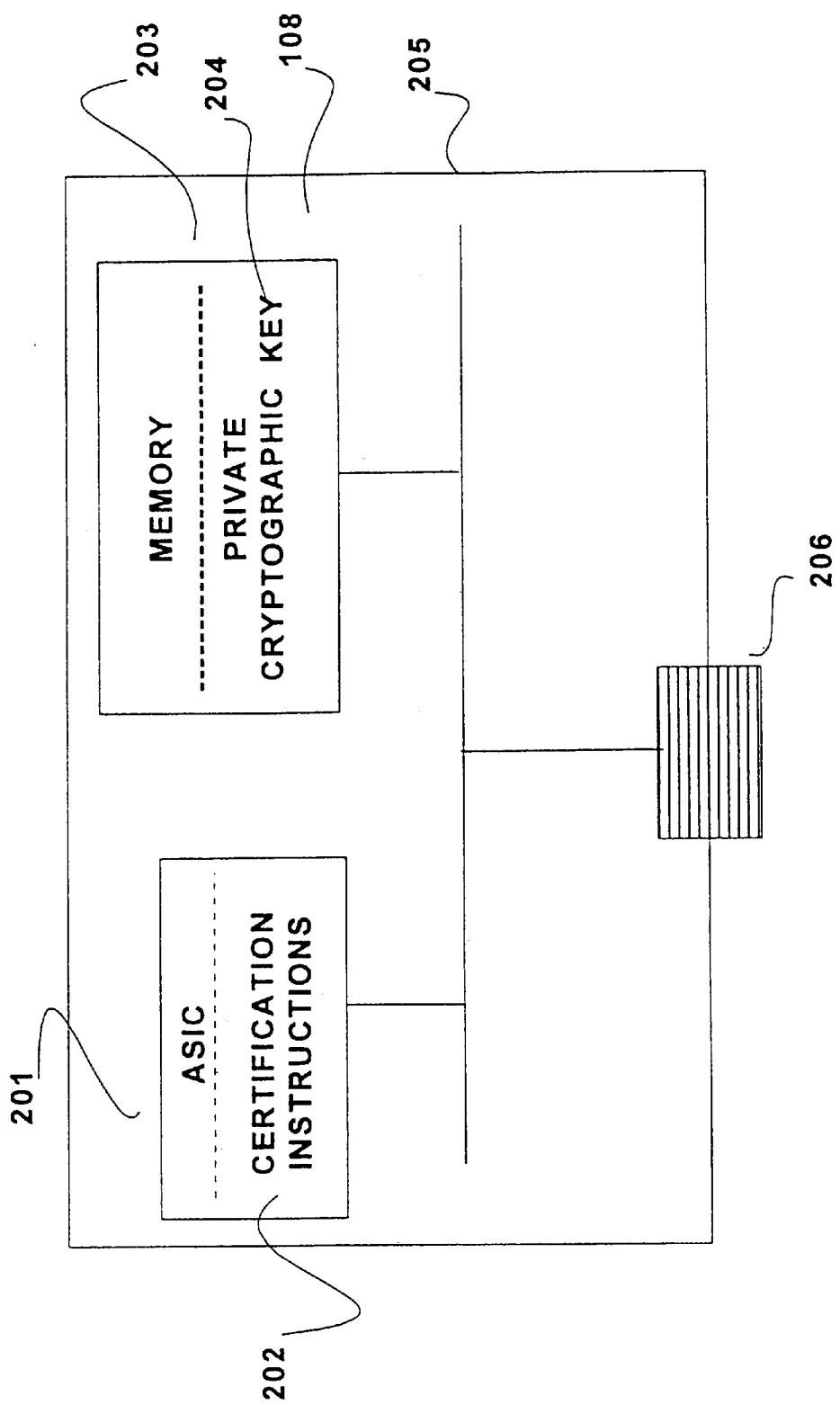
FIG. 2 shows a second embodiment of an apparatus in accordance with the present invention.

Another embodiment of the present invention is shown in FIG. 2. Application Specific Integrated Circuit (ASIC) 201 embodies certification instructions 202 adapted to be executed by the ASIC 201 to determine if a subject set has a particular property, and if it does, to sign it with a a private cryptographic key stored in memory 203. In one embodiment, memory 203 is random access memory (RAM). In another embodiment, memory 203 is a hard disk drive. A tamper-proof enclosure 205 surrounds ASIC 201 and memory 203. Interface 206 is disposed to provide an electrical connection through the tamper-proof enclosure 205. Interface 206 and memory 203 are coupled to ASIC 201.

In another embodiment of the present invention, the processor 102 shown in FIG. 1 is not surrounded by a tamper-proof enclosure 107, the processor being sufficiently trusted (e.g., because it operates in a secure environment, etc.) not to require such an enclosure 107.

Figure 3:
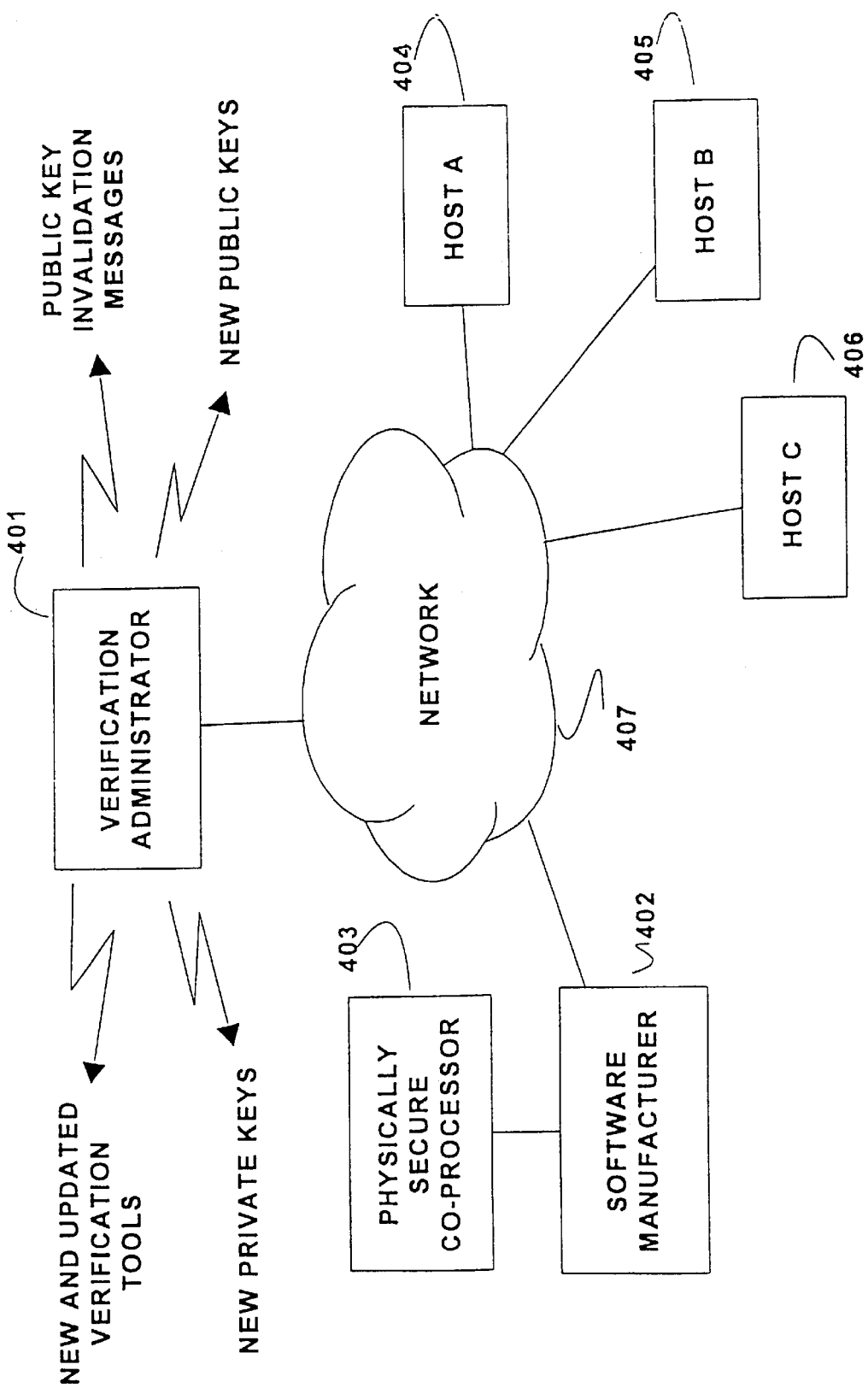
FIG. 3 shows a system-level embodiment of the present invention.

FIG. 3 shows a system-level embodiment of the present invention. Administrator 401, software provider 402, and hosts A 404, B 405 and C 406 are coupled to network 407. In this embodiment, software certification is performed by PSC 403 coupled to provider 402. In another embodiment, certification is performed by the provider 402 itself.

PSC 403 analyzes a subject set to determine if it possesses a particular property, and if it does, it signs the subject set. In one embodiment of the present invention, PSC 403 uses resources (e.g., memory, processor time, etc.) at the provider 402 to analyze and sign (i.e., to certify) the subject set.

In one embodiment, administrator 401 sends a new authorization message that includes updated certification instructions and private cryptographic keys to the PSC 403. In one embodiment, administrator 401 also sends an invalidation message that includes public key invalidation information, and sends new authentication information that includes a public cryptographic key to hosts A 404, B 405 and C 406. In other embodiments, an invalidation message is sent that serves to notify the host that the present version of the certification instructions is invalid. In one embodiment, this results in the invalidation of a symmetric key stored at the host.

In one embodiment of the present invention, if the subject set has a particular property, then the PSC 403 uses the private key from the administrator 401 to generate a signature and produce a certificate. A certificate includes, but need not be limited to, the signature. In one embodiment of the present invention, the certificate also includes signed information about the particular property that the subject set is determined to possess by the PSC 403. In another embodiment, the identity of the property is determined by the way in which signature is produced. For example, in one embodiment, the identity of the property is determined by the identity of the group of keys to which the key used to sign the subject set belongs.

In one embodiment, the subject set of instructions is sent to a host 404. A host 404 can use the public key received from the administrator 401 to check the signature in the certificate associated with a subject set of instructions. If the signature is determined to be valid, then the host 404 is assured that the subject set has the property indicated by the certificate. If the signature is determined not to be valid, then no such assurance is provided to the host 404.

In another embodiment of the present invention, public and private keys are managed by the provider 402. In one embodiment, the keys are managed using certificates embedded in the client, or else are pushed to the client using "push" technologies. Push technologies allow a first party to send information to a second party, whereas "pull" technologies only permit the second party to receive information from the first party at the second party's request. Also, key revocations can be pushed to the client or pulled from a central repository (such as the administrator 401) when the client starts.

Figure 4:
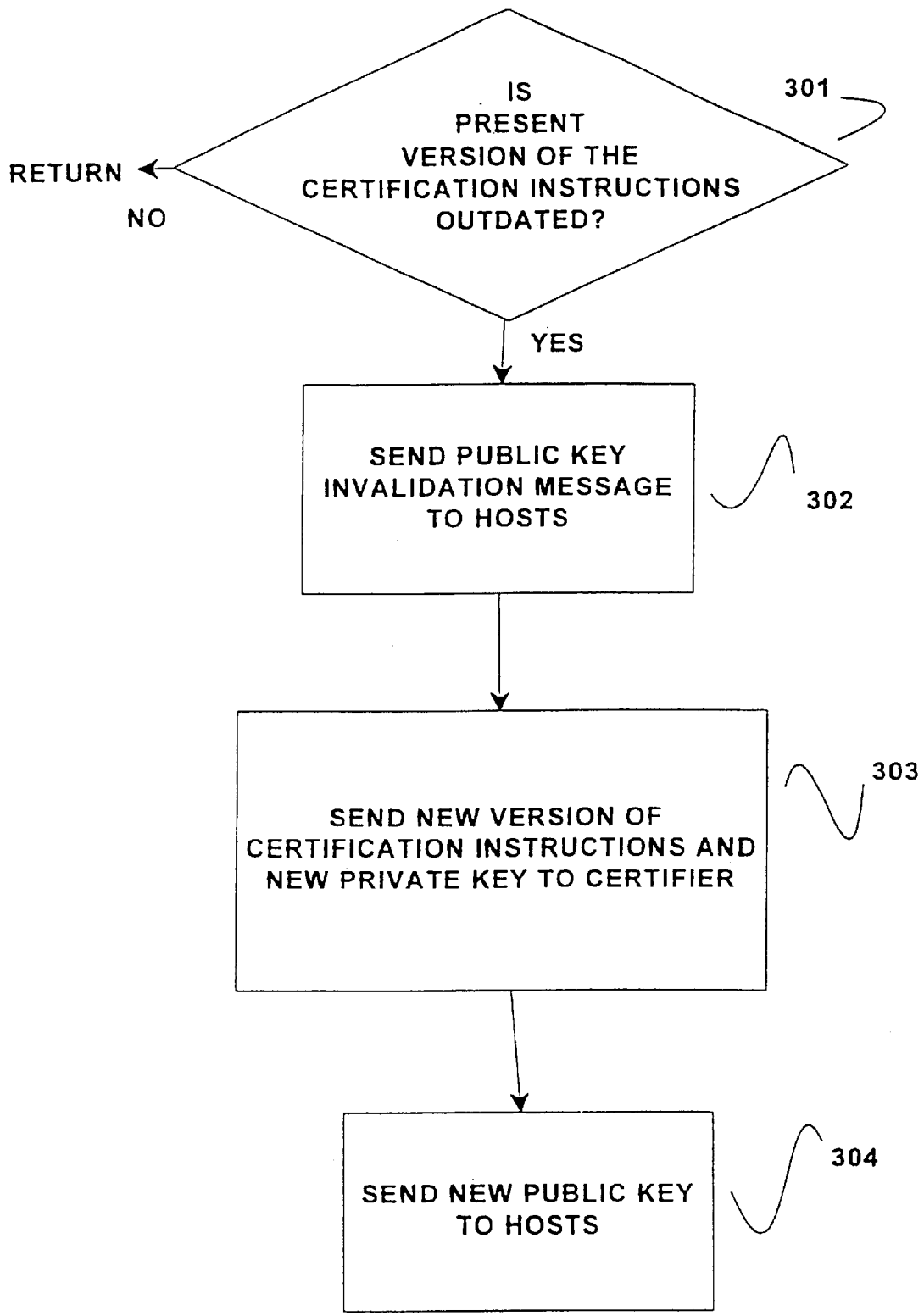
FIG. 4 is a flow chart showing an embodiment of the verifier version management method in accordance with the present invention.

FIG. 4 shows a flow chart that illustrates an embodiment of verifier version management method in accordance with the present invention.

The administrator determines if the presently-distributed version of the certification instructions is outdated, step 301. If the present version outdated, then the administrator sends an invalidation message to a host, step 302. In one embodiment, the invalidation message indicates to a host that the presently distributed public key N is now invalid. In another embodiment, the invalidation message indicates that a symmetric key is invalid. In the general case, the invalidation message carries information to the host that indicates that the a given version of the certification instructions is now invalid or outdated. The present invention is meant to include any invalidation message that functions as such. Thereafter, hosts will determine that signatures from certifiers who have used the outdated version of the certification instructions are invalid.

The administrator then sends a new authorization message to the certifier, step 303. An authorization message causes the certifier to use a new or updated version of certification instructions, and also provides information on how to generate a certificate signifying that the new certification instructions have been used to determine if a subject set possesses a particular property. In one embodiment, the authorization message includes a new version of the certification instructions and a new private key.

New authentication information is also sent to the host, step 304. Authentication information is used by the host to authenticate a certificate, i.e., determine if a certificate is valid. In one embodiment of the present invention, this new authentication information includes a new public key to replace a public key invalidated by the invalidation message. In another embodiment, the authorization message includes a new symmetric key and a segment of update instructions adapted to be patched into the present version of the certification instructions.

Figure 5:
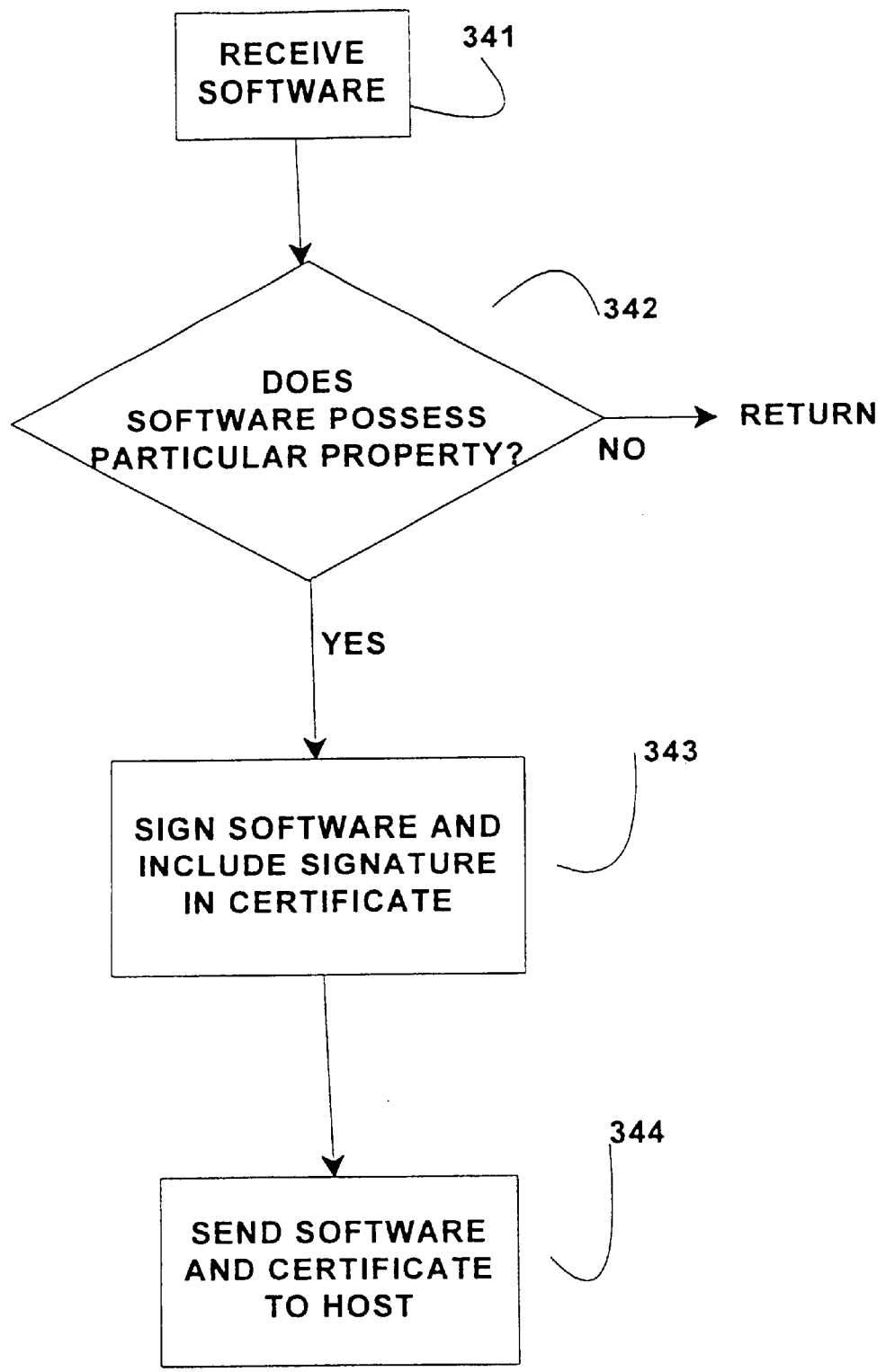
FIG. 5 is a flow chart showing an embodiment of the software certification method in accordance with the present invention.

FIG. 5 is a flow chart showing an embodiment of the certification method in accordance with the present invention. In one embodiment, the certification process is performed by a PSC in conjunction with a provider. In another embodiment, the certification process is performed by the provider alone. In another embodiment, the certification is performed by a third party that is neither a provider nor a host. In yet another embodiment, the certification process is performed by a plurality of certifiers.

A certifier receives a piece of software from a manufacturer or distributor, step 341. The provider uses a version of the certification instructions to determine if the subject set possesses a particular property, step 342. If the subject set possesses the property, the provider signs the subject set to produce a certificate with a signature, step 343. In one embodiment of the present invention, the provider also signs a statement that describes the particular property of the subject set. In one embodiment, the certificate is produced using private cryptographic key N associated with version N of the certification instructions.

The provider distributes the software with the certificate, step 344. In one embodiment, the provider distributes the software and certificate by sending them to a host. In another embodiment, the provider distributes the software and certificate by sending them to an intermediary. In one embodiment, the subject set is in binary form. In another embodiment, the subject set is in source code form.

Figure 6:
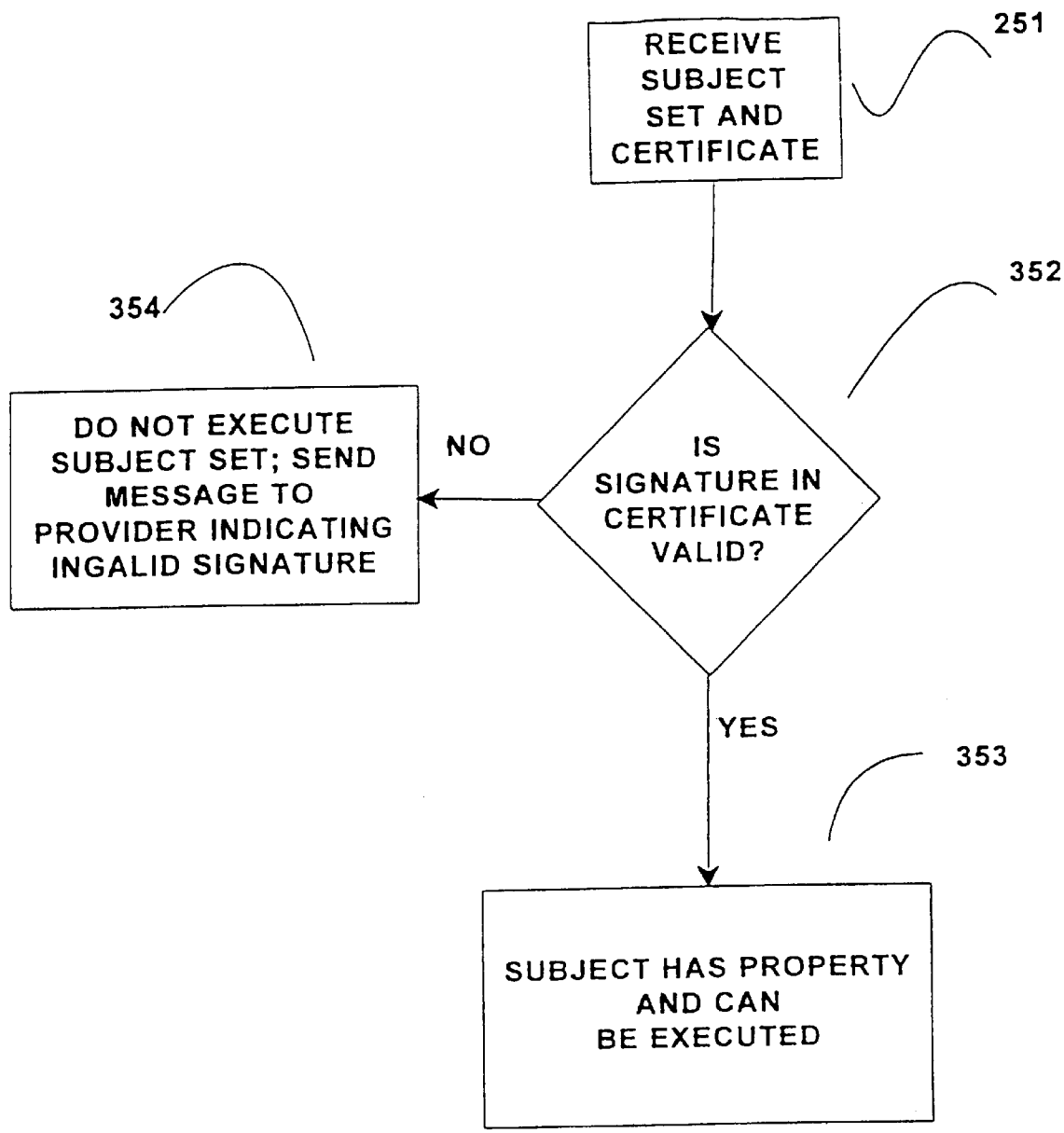
FIG. 6 is a flow chart showing an embodiment of the signature checking method in accordance with the present invention.

FIG. 6 is a f low chart showing an embodiment of the signature checking method in accordance with the present invention. The host receives the subject set (the software) and the certificate from a provider, step 351. The host determines if the certificate is valid, step 352. If the certificate is valid, then the host is assured that the subject set possesses the property, and can execute the subject set, step 353. If the certificate is not valid, then the host is not so assured, and does not execute the subject set. In one embodiment, if the host determines that the certificate is not valid, the host sends a message to the administrator indicating that the host was unable to verify a signature, step 354.

Figure 7:
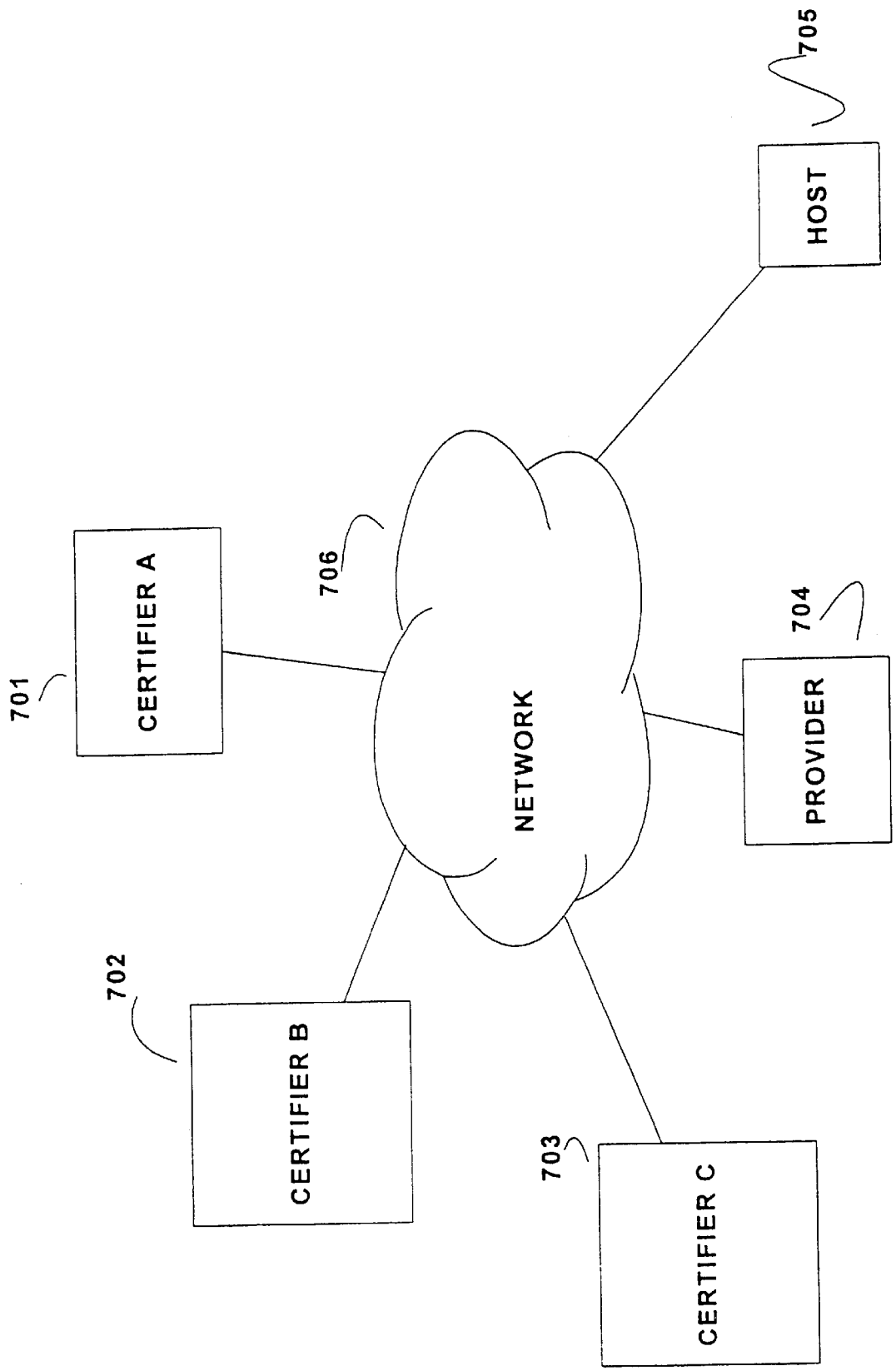
FIG. 7 shows a system-level embodiment of the present invention where a plurality of certifiers certify a piece of software.

FIG. 7 shows another system-level embodiment of the present invention that includes a plurality of certifiers. Certifiers A 701, B 702 and C 703 each certify a subject set of software and each generates a certificate. The subject set is sent to the host 705 by a provider 704 through the network 706. The certificates generated by the certifiers 701, 702 and 703 are sent to the host 704 for verification.

Figure 8:
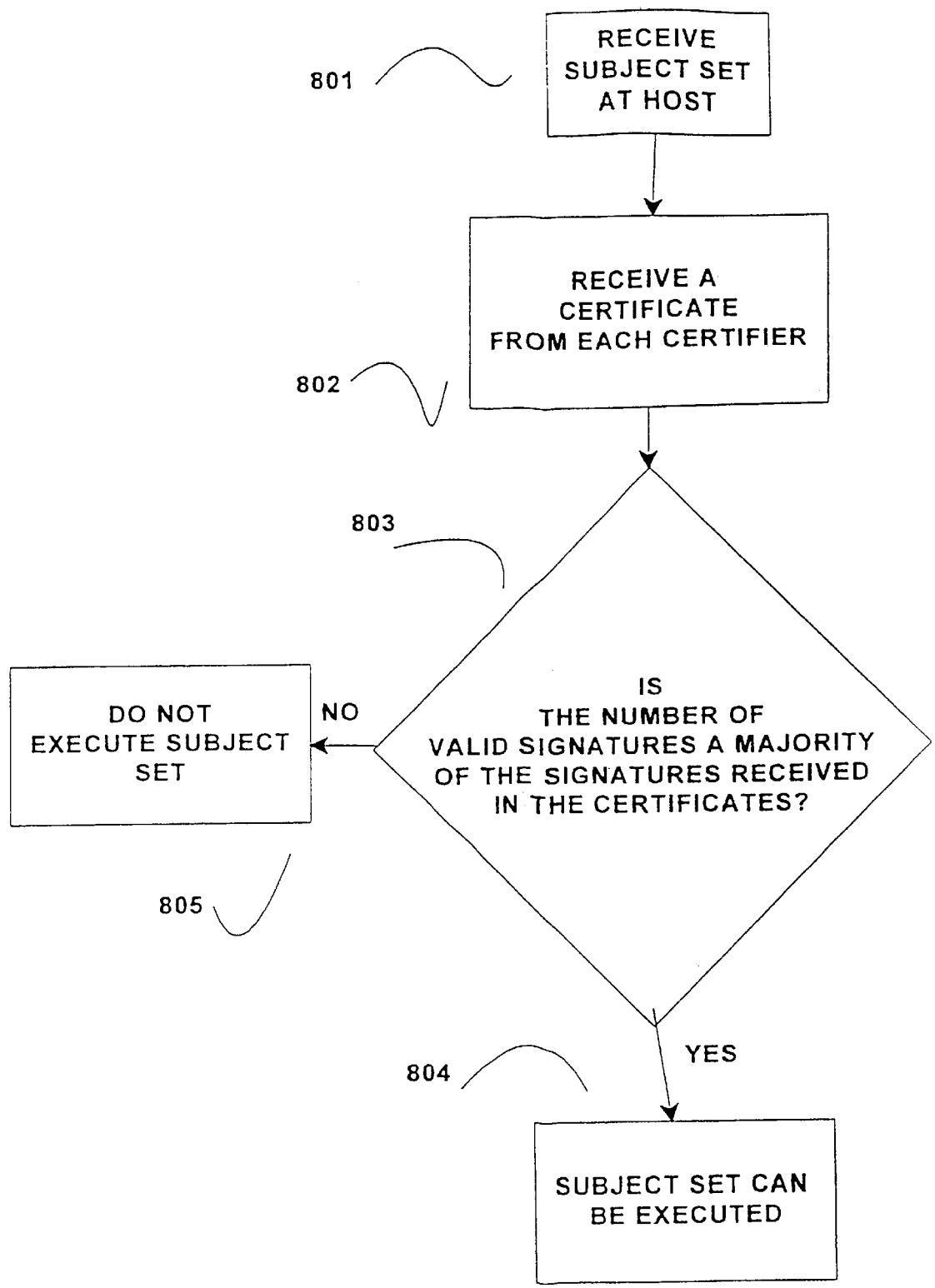
FIG. 8 is a flow chart showing an embodiment of the signature checking method of the present invention where a plurality of certifiers certify a piece of software.

FIG. 8 is a flow chart showing an embodiment of the the signature checking method of the present invention where a first plurality of certifiers are adapted to certify a piece of software. The host receives a copy of the subject set (the software) from the provider, step 801. The host then receives a certificate for the subject set from each of a second plurality of certifiers, step 802. The second plurality can be equal to, or less than, the first plurality. The host determines if each certificate is valid, step 803. If the number of certificates determined to be valid is at least equal to a threshold, then the host can execute the subject set, step 804. If the number of certificates determined to be valid is less than the threshold, then the host does not execute the subject set, step 805. In one embodiment, the threshold is predetermined. In another embodiment, the threshold is determined on-the-fly by the host to fit the particular circumstances surrounding a given subject set. For example, for a subject set obtained from a provider not well known or trusted by the host, the threshold can be set to be larger. For a subject set from a more trusted provider, the threshold can be set to be lower.

The present invention advantageously provides a substantial performance advantage over the known systems that verify software at the host prior to each execution. The advantages of the present invention are achieved in part by providing the host with assurance that a piece of software can be trusted to have a particular property by requiring the host only to check a signature at execution time, while the substantially more burdensome task of certifying the software is carried out more centrally by the provider. This advantageously reduces the need to extensively distribute and exhaustively maintain current software certifiers to a large number of distributed platforms, as is required by systems where the verification of software is performed by the host at run time.

In an embodiment of the present invention where the set of subject instructions is sent in binary form from the provider to the host, the present invention also advantageously provides software property assurance to the host without requiring the manufacturer to disclose valuable confidential intellectual property, such as source code or invariants.

In another embodiment of the present invention, certification instructions stored in a PSC comprise a proof checker. A manufacturer generates a proof carrying binary version of its software (e.g., in annotations of the binary), and reveals the annotations and the proof to the PSC. The PSC generates the certification condition from the binary, checks the proof, and signs the binary together with a statement to the effect that the relevant security property is established to obtain a certificate. This advantageously provides assurance to the client that the code has the security property without revealing to the client the proof or the annotations, thus advantageously protecting valuable intellectual property of the manufacturer. The logistical advantages of the present invention pertaining to certifier version control and key management also apply in this embodiment.

What is claimed is:

1. A method for receiving assurance at a host that a set of subject instructions possesses a particular property, comprising the steps of:
   a. receiving the set of subject instructions at the host;
   b. receiving a certificate including a signature at the host;
   c. receiving a statement that contains the identity of the particular property possessed by the subject set in the certificate;
   d. determining integrity of the subject set of instructions based on the certificate and the statement; and
   e. executing the subject set of instructions, if the integrity of the subject set of instructions is determined.

2. The method of claim 1, wherein the set of subject instructions are signed using a private cryptographic key at a certifier.

3. The method of claim 1, wherein the set of subject instructions are signed using a symmetric cryptographic key at a certifier.

4. The method of claim 1, wherein the set of subject instructions are distributed to the host from a provider.

5. The method of claim 1, wherein the set of subject instructions are distributed to the host from a certifier.

6. The method of claim 1, wherein the set of subject instructions and the certificate that includes the signature are received together at the host.

7. The method of claim 1, wherein the statement containing the identity of the particular property includes a group of keys used for signing the certificate, and the host determines the identity of the particular property based on the group of keys received.

8. A method for providing assurance to a host that a set of subject instructions possesses a particular property, comprising the steps of:
   a. receiving the set of subject instructions at the host;
   b. receiving a certificate including a signature at the host, the certificate generated pursuant to certification instructions used by a certifier;
   c. receiving a statement that contains the identity of the particular property possessed by the subject set in the certificate;
   d. receiving an invalidation message containing an indication that the present version of the certification instructions used by the certifier to determine if the subject set of instructions possesses the particular property is outdated; and
   e. determining not to execute the subject set of instructions based on the invalidation message.

9. The method of claim 8, wherein the invalidation message indicates that a public key is invalid.

10. The method of claim 8, further comprising the step of receiving a new authorization message at the host.

11. The method of claim 10, wherein the new authorization message includes a new public key.

12. The method of claim 10, wherein the new authorization message includes a new key for determining authenticity of certificates.

13. The method of claim 8, wherein the particular property is the identity of the certifier of the set of subject instructions.

14. The method of claim 8, wherein the particular property is the identity of a compiler used to generate the binary version of the subject set of instructions.

15. The method of claim 8, wherein the particular property is the identity of the manufacturer of the subject set of instructions.

16. The method of claim 8, wherein the particular property is the version of the certification instructions used to analyze the subject set of instructions.

17. The method of claim 8, further comprising the step of determining at the host if the signature received in the certificate is valid.

18. The method of claim 17 further comprising refraining from executing the subject set of instructions, if it is determined that the signature received in the certificate is invalid.

19. The method of claim 8, wherein a first plurality of certifiers determine if the set of subject instructions possesses a particular property, and wherein a second plurality of certifiers each send a certificate including a signature to the host, and further comprising the steps of:
   d. determining at the host if a threshold number of signatures is valid;
   e. if the threshold number of signatures are valid, then determining at the host that the subject set of instructions possesses the particular property.

20. A method for providing assurance to a host that a set of subject instructions possesses a particular property, comprising the steps of:
   a. determining if the set of subject instructions possesses the particular property at a certifier; and
   b. if the subject set of instructions is determined to possess the particular property, then:
      I. signing the set of subject instructions at the certifier to obtain a signature; and
      ii. distributing to the host the set of subject instructions, a certificate that includes the signature and an identifier of the certifier, and a statement that contains the identity of the particular property possessed by the set of subject instructions, wherein the subject set of instructions is in binary form.

21. A method for providing assurance to a host that a set of subject instructions possesses a particular property, comprising the steps of:
   a. determining if the set of subject instructions possesses the particular property at a certifier; and
   b. if the subject set of instructions is determined to possess the particular property, then:
      i. signing the set of subject instructions at the certifier to obtain a signature; and
      ii. distributing to the host the set of subject instructions, a certificate that includes the signature and an identifier of the certifier, and a statement that contains the identity of the particular property possessed by the set of subject instructions, wherein the subject set of instructions is in source code form.

22. A method for providing assurance that a piece of software possesses a particular property, including:
   a. receiving a binary version of software containing annotations having a proof that the software possesses the particular property;
   b. checking the proof to determine that the software possesses the particular property;
   c. if the software is determined to have the particular property, then signing the software to obtain a signature; and
   d. sending the signature and a statement identifying the particular property to a recipient.

23. The method of claim 22 wherein a version of the software without the proof and without the annotations is sent to the recipient.

* * * * *